United States Patent [19]

Horwatt et al.

[11] Patent Number: 5,439,965
[45] Date of Patent: Aug. 8, 1995

[54] ABRASION RESISTANT CROSSLINKABLE INSULATION COMPOSITIONS

[75] Inventors: Steven W. Horwatt; James W. Biggs, both of West Chester, Ohio

[73] Assignee: Quantum Chemical Corporation, Cincinnati, Ohio

[21] Appl. No.: 123,017

[22] Filed: Sep. 16, 1993

[51] Int. Cl.⁶ .............................................. C08K 5/54
[52] U.S. Cl. ................... 524/371; 524/264; 524/410; 524/411
[58] Field of Search ............... 526/331; 524/410, 411, 524/371, 264

[56] References Cited

U.S. PATENT DOCUMENTS

| | | |
|---|---|---|
| 3,553,348 | 1/1971 | Betts . |
| 3,832,326 | 8/1974 | North . |
| 3,922,442 | 11/1975 | North . |
| 3,979,356 | 9/1976 | Walters . |
| 4,012,343 | 3/1977 | Raley ................... 524/371 |
| 4,127,559 | 11/1978 | Newcombe ............ 524/411 |
| 4,349,605 | 9/1983 | Biggs et al. . |
| 4,381,362 | 4/1983 | Biggs et al. . |
| 4,666,947 | 5/1987 | Brichta et al. ........ 524/371 |
| 4,732,939 | 3/1988 | Hoshi et al. . |
| 4,845,146 | 7/1989 | Inoue et al. . |
| 4,945,018 | 7/1990 | Abolins et al. . |
| 5,010,210 | 4/1991 | Sidi et al. . |
| 5,178,946 | 1/1993 | Sato et al. ............. 428/463 |
| 5,191,004 | 3/1993 | Maringer et al. . |
| 5,225,468 | 7/1993 | Biggs . |
| 5,225,469 | 7/1993 | Maringer et al. . |

FOREIGN PATENT DOCUMENTS 46-4391  2/1971  Japan .

*Primary Examiner*—Veronica P. Hoke
*Attorney, Agent, or Firm*—Gerald A. Baracka; William A. Heidrich

[57] ABSTRACT

Flame retardant and abrasion resistant crosslinkable compositions useful as insulation for wire and cable are provided. The compositions contain an ethylene-vinyl acetate copolymer having a vinyl ester content of 5 to 12 wt. %, a halogenated compound, antimony trioxide and an organic peroxide. Use of specific halogenated compounds, particularly brominated aromatic compounds, with low vinyl acetate content ethylene-vinyl acetate copolymers yield products which are highly resistant to abrasion after crosslinking.

15 Claims, No Drawings

ABRASION RESISTANT CROSSLINKABLE INSULATION COMPOSITIONS

BACKGROUND OF THE INVENTION

1. Field of the Invention

This invention relates to polymeric compositions useful as insulation for wire and cable products. More specifically, the compositions of the invention are crosslinkable ethylene-vinyl ester copolymers which exhibit improved abrasion resistance.

2. Description of the Prior Art

Polymeric compositions exhibiting a balance of physical properties, processability and flame retardance comprised of a crosslinkable polymer, such as ethylene-vinyl acetate copolymer, silane(s) and hydrated inorganic filler(s) are known and have found wide acceptance in the wire and cable industry. Such compositions are disclosed in U.S. Pat. Nos. 3,832,326 and 3,922,442 to North et al and U.S. Pat. Nos. 4,349,605 and 4,381,362 to Biggs et al. Besides the polymer, silane and hydrated filler, the formulations also typically contain a crosslinking agent and other additives such as pigments, stabilizers, lubricants, antioxidants, and the like.

The compositions of North et al and Biggs et al are particularly useful for the insulation of switchboard wire, appliance wire and automotive wire where a combination of superior electrical properties combined with resistance to the degradative effects of heat and flame are essential and where low smoke density and non-corrosive fumes are desirable. They find particular use as white and colored insulation compositions which can be extruded over metal, e.g., copper or aluminum, conductors to provide a single layer insulating and jacketing composition which meets the automotive primary wire SAE J1128 standard and UL 125° C. appliance wire and Type SIS wire standards.

In certain automotive applications where an insulated wire is enclosed in a tubular metal conduit, such as for antilock braking systems, friction between the metal and insulated wire can abrade the insulation and eventually wear away the insulation and cause electrical problems. It would be highly advantageous if readily processable crosslinkable flame retardant formulations with increased abrasion resistance were available.

SUMMARY OF THE INVENTION

It has now unexpectedly been found that compositions having improved abrasion resistance can be obtained by specifically formulating certain ethylene copolymer resins. When ethylene-vinyl ester copolymers having low levels of vinyl ester, particularly vinyl acetate copolymerized, are formulated with certain halogenated compounds, antimony trioxide and an organic peroxide, resistance to abrasion is significantly improved. This is accomplished without sacrificing processability, physical properties or flame retardance. It is possible with the present invention to obtain a two- to four-fold increase in abrasion resistance compared to the crosslinkable insulation compositions of the prior art.

The compositions of the invention contain (a) 70 to 97 weight percent of a copolymer of ethylene and 5 to 12 weight percent vinyl ester of a $C_{2-6}$ aliphatic carboxylic acid;(b) 2 to 25 weight percent of a halogenated compound wherein bromine or chlorine is substituted on an aromatic or cycloaliphatic ring; (c) 0.03 to 8 weight percent antimony trioxide; and (d) 0.1 to 3 weight percent organic peroxide. Optionally, there may also be included up to 25 weight percent hydrated inorganic filler and up to 3 weight percent of an alkoxysilane.

DETAILED DESCRIPTION OF THE INVENTION

The present invention relates to improved polymeric ethylene copolymer compositions. The compositions exhibit significantly improved resistance to abrasion and are comprised of a copolymer of ethylene and a vinyl ester of an aliphatic carboxylic acid, a halogenated flame retardant, antimony trioxide and an organic peroxide. The compositions also typically contain an antioxidant or combination of antioxidants. Optionally, a hydrated organic filler and alkoxysilane may also be present. The compositions of this invention are crosslinkable and find particular utility as wire and cable insulation.

As employed herein, the terms "crosslink" and "cure" are synonymous and ascribed their normal art recognized meaning, i.e., they denote the formation of primary valence bonds between polymer molecules. Also, all parts and percentages referred to in the specification and claims which follow are on a weight basis unless otherwise indicated. Percentages are based on the total composition except where otherwise stated.

The polymeric component, sometimes referred to as the base resin, used for the present compositions is a copolymer of ethylene and a vinyl ester. The vinyl ester may be a vinyl ester of a $C_2$–$C_6$ aliphatic carboxylic acid, such as vinyl acetate (VA), vinyl propionate, vinyl butyrate, vinyl pentanoate or vinyl hexanoate; however, vinyl acetate is preferred. The comonomer will constitute from about 5 to 12 weight percent of the copolymer.

The ethylene copolymers will have melt indexes from about 0.1 to 10 g/10 min and, more preferably, from about 0.5 to 5 g/10 min. Melt index values employed herein for the base resin are equivalent values correlated from the Melt Flow Rates obtained using ASTM D 1238.

In an especially preferred embodiment of the invention, the ethylene copolymer is an ethylene-vinyl acetate copolymer (EVA) containing from about 5 to about 12 and, more preferably, 7 to about 11 weight percent vinyl acetate with the balance (88 to 95 weight percent) being ethylene.

Terpolymers of ethylene, vinyl acetate and other olefinic monomers can be employed. If a third monomer is present it will generally not constitute more than about 15 weight percent of the polymer composition. It is also possible to include minor amounts of other polymers or copolymers with the ethylene copolymer. Polymers which can be incorporated in minor amounts include polyethylene, polypropylene, ethylene-propylene copolymers and terpolymers, and the like. Low density polyethylene and linear low density polyethylene having melt indexes from 0.5 to 5 are especially well suited for this purpose.

To obtain the compositions of the present invention having a superior abrasion resistance, specific halogenated compounds are employed. It has been found that the addition of these halogenated compounds to low VA content EVA copolymers not only improves the flame retardance but also unexpectedly significantly increases the abrasion resistance of the compositions.

The same marked improvement in abrasion resistance is not observed when the halogenated compounds are used with EVA copolymers having higher VA contents.

Halogenated compounds used are those wherein the halogen is attached, i.e., bonded, to a ring which can be either an aromatic or cycloaliphatic ring. The halogen substituents can be attached to monocyclic, bicyclic or multicyclic rings. The halogen can be either chlorine or bromine; however, bromine is preferred. The halogenated compound may contain other functional groups which do not adversely affect the processing or physical characteristics of the composition.

Illustrative halogenated compounds bearing chlorine or bromine substituents on an aromatic or cycloaliphatic ring include:

perchloropentacyclodecane;
Dieis-Alder adducts of hexachlorocyclopentadiene with "enes" such as maleic anhydride;
hexabromobenzene;
pentabromoethylbenzene 2,4,6-tribromophenol;
tribromophenyl allyl ether;
octabromodiphenyl;
poly(pentabromobenzyl) acylate;
pentabromodiphenyl ether;
octabromodiphenyl ether;
decabromodiphenyl ether;
tetrachlorobisphenol A;
tetrabromobisphenol A;
bis(dibromopropyl)ether of tetrabromobisphenol A;
tetrachlorophthalic anhydride;
tetrabromophthalic anhydride;
hexachloroendomethylenetetrahydrophthalic acid;
ethylene-bis(tetrabromophthalimide);
hexabromocyclododecane; and the like In a highly useful embodiment of the invention, a brominated aromatic compound is utilized with a low VA content EVA copolymer to achieve highly abrasion resistant insulation compositions. The brominated aromatic compounds will correspond to the general formula

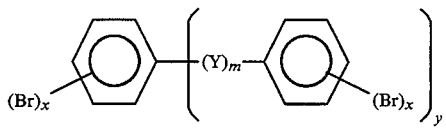

wherein x is an integer from 3 to 6; m is zero or 1; y is zero or 1; and Y is oxygen or a bivalent aliphatic radical of the formula
where n is an integer from 1 to 6. As is apparent from the above formula, the preferred aromatic bromine compounds may be comprised of one or two bromine-substituted aromatic rings. Illustrative radicals of the type Y include

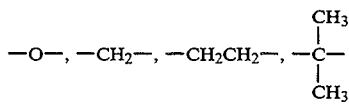

To minimize the amount of the brominated compound required in the formulation, the bromine content of the brominated compound should be as high as possible. The brominated aromatic compounds will generally have bromine contents greater than 65 percent and, more preferably, greater than 75 percent. It is also preferable that the brominated compound be a solid comprised of particles which do not exceed about 10 microns in size. This facilitates dispersing the halogenated compound in the base resin and makes it possible to produce extrudates with smooth surface appearance. Furthermore, to minimize volatilization and loss of the brominated compound during processing and extrusion, it is preferable that the material have a melting point above 200° C. and, more preferably, greater than 250° C. Since the brominated aromatic compounds typically melt over a range of temperatures, onset of melting should not occur before the above-specified temperatures are reached. In a particularly useful embodiment, the aromatic brominated compound is decabromodiphenyl ether of the formula

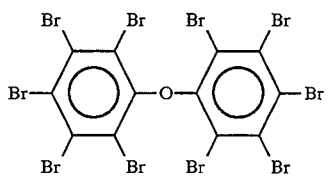

which is abbreviated herein as DBDPO. This commercially available material has a bromine content of 82–83 percent and melts over the range 290°–310° C. The commercial product generally consists of a mixture of about 90 percent decabromodiphenyl ether and about 10 percent nonabromodiphenyl ether and other lesser brominated species.

Antimony trioxide ($Sb_2O_3$) is incorporated into the formulations as a synergist for the halogenated compound. While it is possible to obtain useful formulations without a synergist, flame retardance is increased when they are included and it is possible to use lower levels of the halogenated compound. This latter feature is advantageous from an economic standpoint and also from the standpoint of maximizing the physical properties and processability. While antimony trioxide is the synergist of choice, other known synergists such as antimony pentoxide, antimony silicates, boron compounds, tin oxide, zinc oxide, zinc borate, aluminum trioxide and aluminum trihydroxide may be utilized. In general, the weight ratio of halogenated compound to synergist typically ranges from about 2:1 up to about 5:1 and, more preferably, from about 2.5:1 to 4:1.

To achieve useful wire and cable insulation compositions having the necessary balance of physical properties and thermal and chemical resistance, it is necessary that the compositions be crosslinked. While crosslinking can be accomplished chemically or using high energy radiation, it is more customary to use chemical crosslinking agents. Organic peroxides are the most commonly employed chemical crosslinking agents since they are capable of developing high levels of cure and uniform results. The organic peroxides are incorporated into the formulation at a temperature below their decomposition temperature and later activated to effect cure. Known crosslinking coagents, such as triallylcyanurate and the like, may be included with the organic peroxide to enhance cure.

Conventional organic peroxides known to the art which do not appreciably decompose at the temperatures employed in the processing operation, typically 95° C. to 125° C., can be used for the invention. In an especially useful embodiment organic peroxides which undergo rapid decomposition in the range 150° C. to 205° C. are employed. These are the temperatures typically used in wire curing operations, such as in steam tubes. Curing by exposure to steam is widely practiced in commercial operations by passing the insulated wire or cable through a steam tube maintained at a pressure of 100–400 psi so that residence time is on the order of 15–45 seconds.

Tertiary organic peroxides are particularly useful chemical crosslinking agents. Dicumyl peroxide and alpha,alpha'-bis(t-butylperoxy) diisopropylbenzene are especially advantageous tertiary organic peroxides.

In general, as the amount of crosslinking agent is increased the degree of crosslinking increases. The higher the degree of crosslinking, the greater is the toughness and the greater is the resistance to moisture and chemical reagents of the polymeric composition. When too low a degree of crosslinking is achieved, the physical properties of the product are inadequate and subject to pronounced deterioration upon aging. Insufficient crosslinking results principally in a deficiency in retention of stiffness at elevated temperature since the material will have too low a softening point. The exact degree of crosslinking is therefore varied to take the above factors and their effect on the final product into account. For wire and cable insulation the level of crosslinking is generally greater than 80% although lower values are possible. Crosslinking is determined by extraction of the crosslinked polymer to measure the amount of insoluble gel. Crosslinking levels of 85% to 95% are most typical.

The amounts of the low VA content EVA copolymer, halogenated compound, antimony trioxide synergist and organic peroxide may be varied over wide limits. Useful compositions are generally comprised of 70 to 97 weight percent ethylene copolymer, 2 to 25 weight percent halogenated flame retardant, 0.03 to 8 weight percent antimony trioxide and 0.1 to 3 weight percent organic peroxide. In a more preferred embodiment, the EVA copolymer constitutes from about 80 to 95 weight percent of the composition with about 2 to 15 weight percent aromatic brominated compound, 0.1 to 5 weight percent antimony trioxide and 0.5 to 2 weight percent organic peroxide.

While it is not necessary that a hydrated inorganic filler be used in formulating the polymeric compositions of the invention, fillers may be used if desired. If fillers are used, they are typically present at low levels since it is generally recognized that fillers reduce abrasion resistance. Fillers which can be used are hydrated inorganic fillers, e.g., hydrated aluminum oxide ($Al_2O_3 3H_2O$ or $Al(OH)_3$), hydrated magnesia, hydrated calciumsilicate, hydrated magnesium carbonates, or the like. Of these compounds, hydrated alumina (ATH) is most commonly employed. These fillers, when present, improve the flame retardance by endothermically releasing the water of hydration chemically bound to the filler during combustion or ignition. The filler size should be in accordance with those sizes used by the prior art.

An alkoxysilane is included in the formulation if a filler is present to facilitate binding the polymer and inorganic filler. Any conventional alkoxysilane known to the art can be used so long as it does not combust or degrade during polymer processing or interfere with polymer crosslinking. Alkoxysilanes which can be used include lower alkyl-, alkenyl-, alkynyl-, and aryl-alkoxysilanes containing from 1 to 3 alkoxy substituents having from 1 to 6 and, more preferably, 1 to 3 carbon atoms. Alkoxysilanes having 2 or 3 $C_{1-3}$ alkoxy substituents, e.g. methoxy, ethoxy, propoxy or combinations thereof, are particularly advantageous. Illustrative silanes include methyl triethoxysilane, methyltris ( 2-methoxyethoxy) silane, dimethyldiethoxysilane, ethyltrimethoxysilane, vinyltris ( 2-methoxyethoxy) silane, phenyltris ( 2-methoxyethoxy) silane, vinyltrimethoxysilane and vinyltriethoxysilane, and gamma-methacryloxypropyltrimethoxysilane.

Vinyltrialkoxysilanes are most commonly employed for this purpose and gamma-methacryloxypropyltrimethoxysilane of the formula

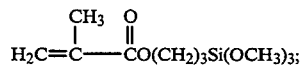

vinyltris(2-methoxyethoxy) silane of the formula

vinyltrimethoxysilane of the formula $H_2C=CHSi(OCH_3)_3$; and vinyltriethoxysilane of the formula $H_2C=CHSi(OCH_2CH_3)_3$ are particularly useful. Vinyltrimethoxysilane is most advantageously used with ATH filled compositions.

When a hydrated inorganic filler and alkoxysilane are incorporated, the amounts can range up to about 25 weight percent and up to about 3 weight percent, respectively. In one embodiment of the invention, the hydrated inorganic filler is present in an amount from about 1 to 20 weight percent and the alkoxysilane is present in an amount from about 0.1 to 2.5 weight percent. Especially useful compositions contain from 5 to 20 weight percent hydrated inorganic filler, preferably ATH, and 0.25 to 2 weight percent alkoxysilane, preferably vinyltrimethoxysilane. In general, the ratio of hydrated inorganic filler to alkoxysilane ranges from 5:1 to 1:1 on a weight basis.

Conventional stabilizers, such as those known to this art, are generally included in the composition to impart the necessary oxidative thermol stability. For example, polymerized 1,2-dihydro-2,2,4-trimethyl quinoline and tris(3,5-di-t-butyl-4-hydroxy benzyl) isocyanurate can be employed. Various thio compounds and hindered phenols, such as those disclosed in U.S. Pat. No. 4,381,362 also provide effective stabilization. Combinations of these latter antioxidants have been demonstrated to be particularly effective and make it possible for the compositions to pass the Canadian Standards Association (CSA) varnish test. Combinations of distearyl-3,3'-thiodipropionate (DSTDP) and tetrakis(methylene(3,5-di-t-butyl-4-hydroxyhydrocinnamate)) methane are most notable in this regard. The CSA test is described in detail in the above-noted reference.

In addition to the foregoing, various other thio compounds, such as dilauryl-3,3'-thiodipropionate, dimyristylthiodipropionate, ditridecylthiodipropionate, bisalkyl sulfides, and hindered phenols, such as 2,6-di-t-butyl-p-cresol, octadecyl 3,5-di-t-butyl-4-hydroxyhydrocinnamate, 2,2'-methylene bis(6-t-butyl-4-methylphenol), 4,4'-butylidene bis(6-t-butyl-3-methyl phenol), 1,3,5-trimethyl-2,4,6-tris(3,5-di-t-butyl-4-hydroxybenzyl) benzene, and 2,2'-methylene bis(4-methyl-6-t-butylphenol) can be used.

Also, other antioxidants and stabilizers known to the art for the stabilization of polyolefin resins can be utilized. These can be employed alone or together with the above noted antioxidants or antioxidant systems. Such stabilizers include ultraviolet light stabilizers of the hindered amine, benzophenone or nickel type. Antioxidants and stabilizers utilized should not have a detrimental effect on polymer crosslinking.

Processing aids, i.e., lubricants, may also be included in the compositions of the invention used to extrusion coat wire and cable. Such processing aids not only improve processability but also improve surface quality and strippability of the wire or cable insulation. Conventional processing aids which can be utilized for the purpose of this invention include fatty acids and fatty acid soaps such as calcium stearate, aluminum stearate, silicone oils, long chain aliphatic amides, natural and synthetic hydrocarbon waxes, low molecular weight polyethylene waxes, low molecular weight aliphatic resins and the like. A particularly useful lubricant combination disclosed in U.S. Pat. No. 4,349,605 is a mixture of lauric acid and ethylene-bis-stearamide.

In addition to the foregoing, other additives may also be included such as carbon black, pigments and the like provided they do not interfere with crosslinking or detract from the physical properties of the compositions. The total amount of additives will generally not exceed 10 weight percent. More commonly, the total additives content is less than 7.5 weight percent.

Stabilizers, i.e., antioxidant or antioxidant package, are selected to meet the service requirements for the particular application and generally are present from about 0.5 to 5 weight percent and, more preferably, from 0.75 to 4 weight percent. Higher levels of antioxidant are required where high temperature wire and cable applications are involved. If two or more antioxidants are employed, they may be added to the formulation separately or combined prior to incorporation. The processing additive(s) typically is present from about 0.25 up to about 5 weight percent and, more preferably, from about 0.5 to 4 weight percent.

The ingredients can be combined with the base resin separately or added as a mixture or masterbatch. The base resin and ingredients are blended in a mixer or the like. Mixers capable of imparting high shear such as Banbury, Farrel Continuous Mixer, Bolling Mixtrumat ™ or Werner & Pfleiderer Mixer are most commonly used. If a hydrated inorganic filler is employed, the silane is preferably added to the polymer and blended before the addition of the hydrated filler and other additives.

Various aspects of the invention are described in greater detail in the examples which follow. These examples are for illustration purposes only and are not intended to limit the invention. Numerous variations are possible without deviating from the spirit and scope of the invention and will be apparent to those skilled in the art.

Formulations used in the examples were obtained by adding the ingredients to a Banbury mixer and mixing until the temperature reached 121° C.–usually about 2-½ to 3 minutes. The product was then dropped from the mixer and sheeted on a 2roll mill at a temperature of 104°–110° C. Plaques were pressed from the sheet for use in evaluating physical properties, flame retardance and abrasion resistance. The plaques were molded and cured by heating in a compression mold maintained at 250 psi and 198°–205° C. for six minutes. Under these conditions cures of 80 percent or greater are achieved.

Physical properties (tensile strength and elongation) of the cured compositions were determined in accordance with ASTM D 638. Flame retardance was determined using the UL 94 Horizontal Burn Test and reported as either "pass" or "fail." Resistance to abrasion was measured in accordance with ASTM D 3389 and the results reported as percent weight change. Values reported for percent weight loss are the average of three determinations. Some samples were also evaluated for resistance to thermal aging which was determined by heating the samples in a forced-air circulating oven for seven days at 165° C. Tensile strength and elongation of the heat aged samples were determined and the percent retention of original tensile or elongation reported.

EXAMPLE I

A composition of the invention was prepared in accordance with the following recipe:

|  | Weight Percent |
| --- | --- |
| Ethylene-vinyl acetate copolymer (9% VA; Melt Index 2.2) | 94.82 |
| Decabromodiphenyl ether | 2.4 |
| Antimony trioxide | 0.8 |
| Alpha,alpha'-bis(t-butylperoxy) diisopropylbenzene | 1.0 |
| Irganox ® 1010[1] | 0.65 |
| Seenox ® 412S[2] | 0.33 |

[1]Pentaerythrityl tetrakis[3(3',5'-di-t-butyl-4-hydroxyphenyl)propionate]
[2]Pentaerythritol tetrakis(betalaurylthiopropionate)

The composition was evaluated to determine physical properties, flame retardance and resistance to abrasion with the following results:

| Tensile Strength | 3200 psi |
| --- | --- |
| Elongation | 1030% |
| Flame Retardance | PASS |
| Abrasion | 0.092% weight loss |

Ninety-nine percent of the tensile strength and 99 percent of the elongation were retained when the composition was subjected to heat aging for seven days at 165° C.

COMPARATIVE EXAMPLE A

A formulation identical to that of Example I was prepared except that the ethylene-vinyl acetate copolymer used contained 18 percent vinyl acetate. The melt index of the copolymer was 2.0. While the physical properties (tensile strength and elongation) and flame retardance of the comparative composition were virtually identical to that obtained for the composition of Example I, abrasion resistance was significantly diminished. The comparative product had 0,196 percent weight loss in the abrasion test–more than double that obtained with the product of Example I. The significant difference in abrasion resistance of the formulated products is particularly surprising in view of the fact that the abrasion resistance of the base resins is essentially the same–0.039 percent for the 9 percent VA content EVA copolymer and 0.043 percent for the 18 percent VA content EVA copolymer. The use of a brominated aromatic flame retardant compound with the low VA content EVA copolymer provides an unexpected improvement in abrasion resistance.

EXAMPLES II-V

To demonstrate the versatility of the invention and the ability to vary the level of the halogenated compound, Example I was repeated using 5, 10, 20 and 30 weight percent DBDPO. The ratio of DBDPO to Sb2O3 was maintained at 3:1. Weight percentages of the ingredients used in each of the compositions and percent weight loss obtained when the crosslinked formulation was subjected to the abrasion test are tabulated below:

|  | EXAMPLE NO. | | | |
| --- | --- | --- | --- | --- |
|  | II | III | IV | V |
| Ethylene-vinyl acetate copolymer (9% VA; Melt Index 2.2) | 91.35 | 84.69 | 71.35 | 58.02 |
| Decabromodiphenyl ether | 5 | 10 | 20 | 30 |
| Antimony Trioxide | 1.67 | 1.0 | 1.0 | 10 |
| Alpha,alpha'-bis(t-butylperoxy) diisopropylbenzene | 1.0 | 1.0 | 1.0 | 1.0 |
| Irganox ® 1010 | 0.65 | 0.65 | 0.65 | 0.65 |
| Seenox ® 412S | 0.33 | 0.33 | 0.33 | 0.33 |
| Percent Weight Loss | 0.117 | 0.113 | 0.142 | 0.135 |

EXAMPLES VI AND VII

Two formulations were prepared in accordance with the above-described procedures using a chlorine-containing polycyclic flame retardant additive. The compositions were as follows:

|  | EXAMPLE NO. | |
| --- | --- | --- |
|  | VI | VII |
| Ethylene-vinyl acetate copolymer (9% VA; Melt Index 2.2) | 91.35 | 84.69 |
| Dechlorane Plus ®[1] | 5 | 10 |
| Antimony Trioxide | 1.67 | 3.33 |
| Alpha,alpha'-bis(t-butylperoxy) diisopropylbenzene | 1.0 | 1.0 |
| Irganox ® 1010 | 0.65 | 0.65 |
| Seenox ® 412S | 0.33 | 0.33 |

[1]Dechlorane Plus ® is a commercially available crystalline flame retardant of the formula

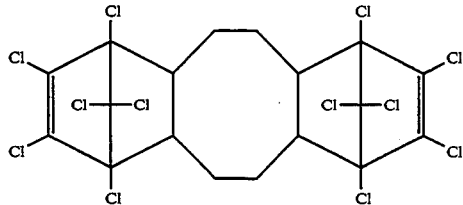

Both compositions exceed the abrasion resistance requirements of SAE J1128 for primary automotive wire. Percent weight loss obtained in the abrasion test with compositions VI and VII was 0.154 and 0.144, respectively.

EXAMPLE VIII

Following the general procedure of Example I a filled composition suitable for wire and cable insulation was prepared in accordance with the following recipe:

|  | Weight Percent |
| --- | --- |
| Ethylene-vinyl acetate copolymer (9% VA; Melt Index 2.2) | 70.3 |
| Decabromodiphenyl ether | 2.4 |
| Antimony trioxide | 0.8 |
| Hydrated Alumina | 24.5 |
| Vinyltrimethoxysilane | 0.25 |
| Alpha,alpha'-bis(t-butylperoxy) diisopropylbenzene | 1.0 |
| Irganox ® 1010 | 0.65 |
| Seenox ® 412S | 0.33 |

The physical properties, flame retardance and abrasion resistance of the cured product was determined and the values were as follows:

| Tensile Strength | 2580 psi |
| --- | --- |
| Elongation | 630% |
| Flame Retardance | PASS |
| Abrasion | 0.099% weight loss |

COMPARATIVE EXAMPLE B

For the purpose of comparison, Example VIII was repeated except that an ethylene-vinyl acetate copolymer having 18 percent vinyl acetate content was substituted for the EVA copolymer having 9 percent VA copolymerized. While the tensile strength, elongation and flame retardance obtained for the comparative product were comparable to that of the product of Example VIII, the weight percent loss obtained in the abrasion test was significantly higher. The percent weight loss obtained with the comparative composition was 0.260 which is nearly a three-fold increase in abrasion over that obtained with the composition wherein the base resin was the 9% vinyl acetate copolymer.

We claim:

1. A crosslinkable polymeric composition comprising:
   (a) 70 to 97 weight percent of a copolymer of ethylene and 5 to 12 weight percent vinyl ester of a $C_{2-6}$ aliphatic carboxylic acid;
   (b) 2 to 25 weight percent of a halogenated compound wherein bromine or chlorine is substituted on an aromatic or cycloaliphatic ring;
   (c) 0.03 to 8 weight percent antimony trioxide; and
   (d) 0.1 to 3 weight percent organic peroxide.

2. The crosslinkable polymeric composition of claim 1 wherein the ethylene-vinyl ester copolymer is an ethylene-vinyl acetate copolymer having a melt index from 0.1 to 10 g/10 min and the halogenated compound is a brominated compound and containing greater than 65 percent bromine having a melting point above 200° C.

3. The crosslinkable polymeric composition of claim 2 containing 80 to 95 weight percent (a), 2 to 15 weight percent (b), 0.1 to 5 weight percent (c) and 0.5 to 2 weight percent (d).

4. The crosslinkable polymeric composition of claim 3 wherein the halogenated compound is a brominated aromatic compound of the formula

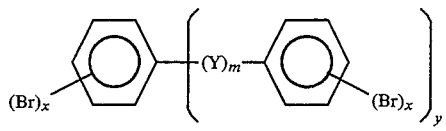

where x is an integer from 3 to 6, m is zero or 1, y is zero or 1 and Y is oxygen or a bivalent aliphatic radical of the formula of $C_nH_{2n}$ where n is an integer from 1 to 6.

5. The crosslinkable polymeric composition of claim 4 wherein the ethylene-vinyl acetate copolymer has a vinyl acetate content of from 7 to 11 weight percent.

6. The crosslinkable polymeric composition of claim 5 wherein the ethylene-vinyl acetate copolymer has a melt index from 0.5 to 5 g/10 min.

7. The crosslinkable polymeric composition of claim 5 wherein the halogenated compound has a bromine content greater than 75 percent and melting point greater than 250° C.

8. The crosslinkable polymeric composition of claim 7 wherein the halogenated compound is decabromodiphenyl ether.

9. The crosslinkable polymeric composition of claim 8 wherein the organic peroxide is dicumyl peroxide.

10. The crosslinkable polymeric composition of claim 8 wherein the organic peroxide is alpha,alpha'-bis(t-butylperoxy) diisopropylbenzene.

11. The crosslinkable polymeric composition of claim 1 wherein the ethylene-vinyl ester copolymer is an ethylene-vinyl acetate copolymer having a vinyl acetate content of 7 to 11 weight percent and melt index from 0.1 to 10 g/10 min.; the halogenated compound is a brominated aromatic compound containing greater than 65 weight percent bromine and having a melting point above 200° C. and corresponding to the formula

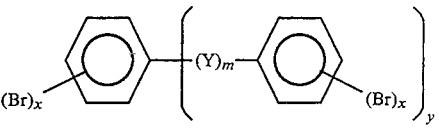

where x is an integer from 3 to 6, m is zero or 1, y is zero or 1 and Y is oxygen or a bivalent aliphatic radical of the formula of $C_nH_{2n}$ where n is an integer from 1 to 6, and additionally containing 1 to 20 weight percent hydrated inorganic filler and 0.1 to 2.5 weight percent alkyl-, alkenyl-, alkynyl-, or arylalkoxysilane containing from 1 to 3 alkoxy groups having from 1 to 6 carbon atoms.

12. The crosslinkable polymeric composition of claim 11 wherein the halogenated compound has a bromine content greater than 75 percent and melting point greater than 250° C., the hydrated inorganic filler is hydrated alumina and the alkoxysilane is a vinyltrialkoxysilane wherein the alkoxy group contains from 1 to 3 carbon atoms.

13. The crosslinkable polymeric composition of claim 12 containing 80 to 95 weight percent (a), 2 to 15 weight percent (b), 0.1 to 5 weight percent (c), 0.5 to 2 weight percent (d), 5 to 20 weight percent hydrated alumina and 0.25 to 2 weight percent vinyltrialkoxysilane.

14. The crosslinkable polymeric composition of claim 12 wherein the halogenated compound is decabromodiphenyl ether, the organic peroxide is dicumyl peroxide and the vinyltrialkoxysilane is vinyltrimethoxysilane.

15. The crosslinkable polymeric composition of claim 12 wherein the halogenated compound is decabromodiphenyl ether, the organic peroxide is alpha,alpha'-bis(t-butylperoxy) diisopropylbenzene and the vinyltrialkoxysilane is vinyltrimethoxysilane.

* * * * *